US007356511B2

(12) United States Patent
Gaya

(10) Patent No.: US 7,356,511 B2
(45) Date of Patent: Apr. 8, 2008

(54) METHOD AND APPARATUS FOR MARKING CONTENT DURING DISTRIBUTION OF THE CONTENT TO A CLIENT

(75) Inventor: Bruce Gaya, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 884 days.

(21) Appl. No.: 10/236,262

(22) Filed: Sep. 6, 2002

(65) Prior Publication Data

US 2004/0049395 A1    Mar. 11, 2004

(51) Int. Cl.
*G06Q 99/00* (2006.01)

(52) U.S. Cl. .......................... 705/51; 705/57; 705/59; 380/200; 380/201; 380/202; 380/203; 726/27; 726/30; 726/32; 713/182; 713/186

(58) Field of Classification Search ............ 705/51–59; 380/200–203; 726/27–32; 713/182–186
See application file for complete search history.

(56) References Cited

U.S. PATENT DOCUMENTS

| 7,197,156 | B1 * | 3/2007 | Levy | 382/100 |
|---|---|---|---|---|
| 2002/0194492 | A1 * | 12/2002 | Choi et al. | 713/200 |
| 2003/0099355 | A1 * | 5/2003 | Moroney | 380/210 |
| 2003/0185417 | A1 * | 10/2003 | Alattar et al. | 382/100 |
| 2004/0236949 | A2 * | 11/2004 | Wouters et al. | 713/176 |

OTHER PUBLICATIONS

Collberg et al., "Software Watermarking: Models and Dynamic Embeddings", 1999, ACM.*
Hobby et al., "Enhancing Degraded Document Images via Bitmap Clustering and Averaging", 1997, Foruth International Conference on Document Analysis and Recognition.*
Hobby et al, "Degraded Character Image Restoration", 1996, Proceedings of the Fifth Annual Sympoisum on Doucment Analysis and Image Retrieval.*

* cited by examiner

*Primary Examiner*—Jalatee Worjloh
(74) *Attorney, Agent, or Firm*—Park, Vaughan & Fleming LLP

(57) ABSTRACT

One embodiment of the present invention provides a system that facilitates marking content during distribution of the content to a client. The system starts by receiving a request for the content from the client at the server and then obtaining a content identifier for the content. Next, the server generates a version identifier that uniquely identifies the version of the content that is sent to the client. Once the version identifier has been generated, the server stores the version identifier in a database along with information to facilitate identification of the requesting client. Finally, the server creates the version of the content by marking the content with the version identifier and delivers the version to the client. Note that the markings on the content facilitate subsequent identification of the client by examining the version of the content.

9 Claims, 2 Drawing Sheets

METHOD AND APPARATUS FOR MARKING CONTENT DURING DISTRIBUTION OF THE CONTENT TO A CLIENT

BACKGROUND

1. Field of the Invention

The present invention relates to computer networks. More specifically, the present invention relates to a method and an apparatus for marking content during distribution of the content to a client, so that markings on the content facilitate identification of the client.

2. Related Art

The explosive growth of the Internet has led to the proliferation of content and of software that facilitates the sharing of content. Most published content is presently available to the public in electronic form. This, coupled with the fact that high capacity digital storage media, such as CD-ROMs, are cheap enough that they are available to the majority of the general public, has sparked widespread sharing and duplication of content that is virtually identical in quality to the source.

While sharing of content, in many cases, is beneficial to the society in general and should be encouraged, a growing piece of this trend is focused on piracy and the unlawful duplication of content. The future holds even more appeal to those in the illegal duplication and distribution business. Movies are starting to be filmed and produced entirely on digital mediums. When a theater receives a digital copy of a movie from the film studio, they are also receiving a perfect master from which near-perfect copies of the movie can be made.

Many safeguards have been put into place to prevent the illegal copying of protected content. While many of these safeguards work well when they are distributed, they are quickly defeated by other individuals, many of whom view the new safeguards as a challenge that they must break. Current safeguards being placed on distributed content not only discourage the illegal duplication of the content, but they are starting to disallow operations that a purchaser of the content has the legal right to perform. For instance, in their continual quest to prevent the duplication of music CDs purchased from legitimate sources, the recording industry has placed anti-duplication measures on the CDs that are so restrictive, they do not allow the purchaser to copy the songs to his or her MP3 player, or to even play the music CD in a drive that is connected to a PC.

What is needed, in this case, is a method and apparatus that discourages the illegal copying of content while not preventing the consumer from making legal copies of the content.

SUMMARY

One embodiment of the present invention provides a system that facilitates marking content during distribution of the content to a client. The system starts by receiving a request for the content from the client at the server and then obtaining a content identifier for the content. Next, the server generates a version identifier that uniquely identifies the version of the content that is sent to the client. Once the version identifier has been generated, the server stores the version identifier in a database along with information to facilitate identification of the requesting client. Finally, the server creates the version of the content by marking the content with the version identifier and delivers the version to the client. Note that the markings on the content facilitate subsequent identification of the client by examining the version of the content.

In a variation on this embodiment, the server marks the version of the content using more than one marking method. Multiple non-interfering marks can be applied to the same part of the content. Note that each subsequent download of the same content potentially would be marked with different marking methods.

In a further variation on this embodiment, the server marks different sections of the content using different marking methods, so that any given section of the content is not operated on by all of the marking methods.

In a variation on this embodiment, the server marks the content in such a manner that removal of the mark degrades the quality or usability of the content.

In a variation on this embodiment, in marking the content information added to the content that does not affect usability of the content by the client and facilitates identifying the client at a later time.

In a variation on this embodiment, the server stores a number of items in the database including, the client's IP address, the current date and time, and information that facilitates identifying the client.

One embodiment of the present invention provides a system that facilitates identification of the client to which a version of content was originally distributed. The system starts by receiving the version of the content, and examining it for the presence of a mark. Once a mark has been found, the system examines the mark to determine a version identifier for the content. If a version identifier is found in the mark, the system performs a look up of the version identifier in a database to determine the client to which the version of the content was originally distributed.

In a variation on this embodiment, the process of determining the client to which the version of the content was originally distributed is performed each time the version of the content is uploaded to a server or delivered across a network.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer Network

Figure 1:
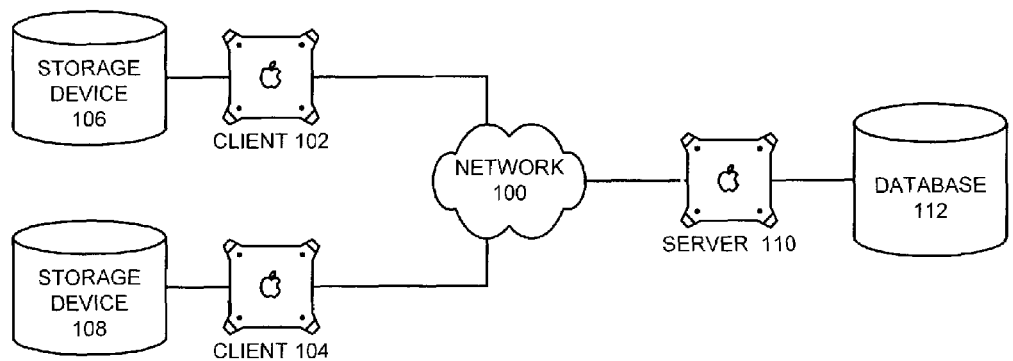
FIG. 1 illustrates a computer network in accordance with an embodiment of the present invention.

FIG. 1 illustrates a computer network 100 in accordance with an embodiment of the present invention. As is illustrated in FIG. 1, client 102 and client 104 are connected to network 100. Clients 102 and 104 can generally include any node on a network including computational capability and including a mechanism for communicating across the network. Network 100 can generally include any type of wire or wireless communication channel capable of coupling together computing nodes. This includes, but is not limited to, a local area network, a wide area network, or a combination of networks. In one embodiment of the present invention, network 100 includes the Internet.

Client's 102 and 104 include storage devices 106 and 108, respectively. Storage devices 106 and 108 can include any type of non-volatile storage device that can be coupled to a computer system. This includes, but is not limited to, magnetic, optical, and magneto-optical storage devices, as well as storage devices based on flash memory and/or battery-backed up memory.

Server 110 is connected to network 100. Server 110 can generally include any computational node including a mechanism for servicing requests from a client for computational and/or data storage resources. Server 110 is additionally connected to database 112. Database 112 can include any type of system for storing data in non-volatile storage. This includes, but is not limited to, systems based upon magnetic, optical, and magneto-optical storage devices, as well as storage devices based on flash memory and/or battery-backed up memory.

Content Download Process

Figure 2:
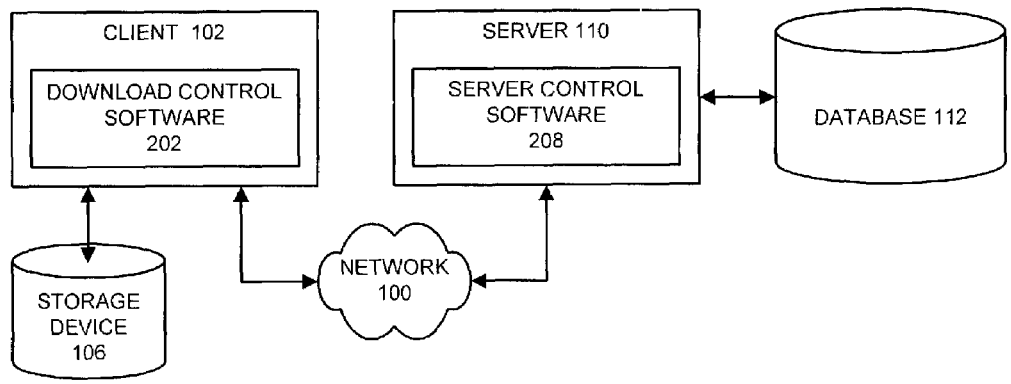
FIG. 2 illustrates the content download process in accordance with an embodiment of the present invention.

FIG. 2 illustrates the content download process in accordance with an embodiment of the present invention. As illustrated in FIG. 2, client 102 and server 110 are coupled to network 100. Client 102 is also coupled to storage device 106 and server 110 is also coupled to database 112. Client 102 contains download control software 202. Server 110 contains server control software 208.

In one embodiment of the present invention, download control software 202 in client 102 contacts server control server 208 in server 110 to request an item of content. Server 110 then authenticates client 102. If the authentication of client 102 is successful, server control software 208 retrieves the content from database 112. Next, server control software 208 generates a content identifier for the content and a unique version identifier for this download instance. The version identifier is then associated with information that facilitates identification of client 102. This information can include, for example, client 102's IP address, the date and time, and the content identifier. This information, along with the content identifier and version identifier, is then stored in database 112. Note that the version identifier can also be referred to as the download identifier.

Server control software 208 now determines the number and type of marking methods to mark the content with. In one embodiment of the present invention, server control software 208 retrieves the marking methods from database 112 to be used for this particular content. Server control software 208 then marks the content with the version identifier via the various marking methods. In one embodiment of the present invention, each marking method is applied to a different portion of the content so that any given portion contains, at most, one mark. In another embodiment of the present invention, multiple non-interfering marks are added to the same part of the content. Moreover, the marks are applied to the content such that the mark is invisible to the user, and removal of the mark will degrade the content and render it unusable. After server control software 208 finishes marking the content, the content is delivered to client 102.

Optionally, the marking method can be varied at random so each download of the same piece of content can contain different marks. This makes it very difficult for a hacker to write and publish a mark removal program that removes all marks from a particular content title or any such universal mark-removal program. Note also that the mark detection only need to find one or the marks employed to record the original version identifier (or version) and can make multiple passes over the content until one of the employed marks is found, so the detector does not need an exact knowledge of the marks used. In one embodiment of the present invention, client 102 always receives content marked with a specific set of marking methods. In this same embodiment, client 104 always receives content marked with a specific set of marking methods that are different from those used for client 102. This is a further security measure because a client cannot fully analyze the mark methods used without receiving download samples from many additional clients.

Note that in one embodiment of the present invention, database 112 includes three separate databases: a content database, an account database, and a marking method database.

Client Detection Process

Figure 3:
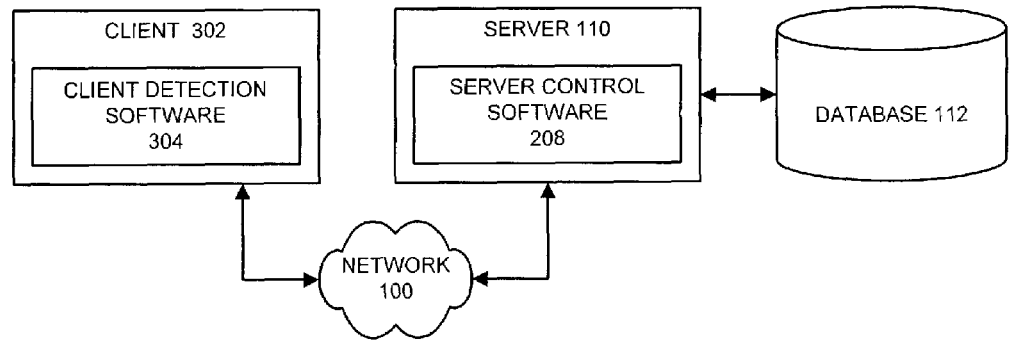
FIG. 3 illustrates the client detection process in accordance with an embodiment of the present invention.

FIG. 3 illustrates the client detection process in accordance with an embodiment of the present invention. As is illustrated in FIG. 3, client 302 contains client detection software 304 and is coupled to network 100. Note that client 302 can generally include any node on a network including computational capability and including a mechanism for communicating across the network. FIG. 3 also illustrates server 110, which contains server control software 208, and is coupled to network 100. Server 110 is additionally coupled to database 112.

Client 302 initially contains a piece of content and wants to determine the client that originally downloaded the software. Client detection software 304 sends a message to server control software 208 to request detection of a client. Server control software 208 then authenticates client 302, and if the authentication is successful and client 302 has the appropriate permissions, server control software 208 sends a request to client detection software 304 for the content.

Upon receiving the request, client detection software 304 uploads the content to server control software 208. Upon receiving the content, server control software 208 looks up the content identifier in database 112 to determine the marking methods used on this particular content. Server control software 208 then examines the content for the presence of the marks. When a mark is found, server control software 208 analyzes the mark to determine the version identifier. Once the version identifier has been read, server control software 208 looks up the version identifier in database 112 to determine the client that originally downloaded the content. Server control software 208 then shares this information with client detection software 304 on client 302.

Process of Marking Content

Figure 4:
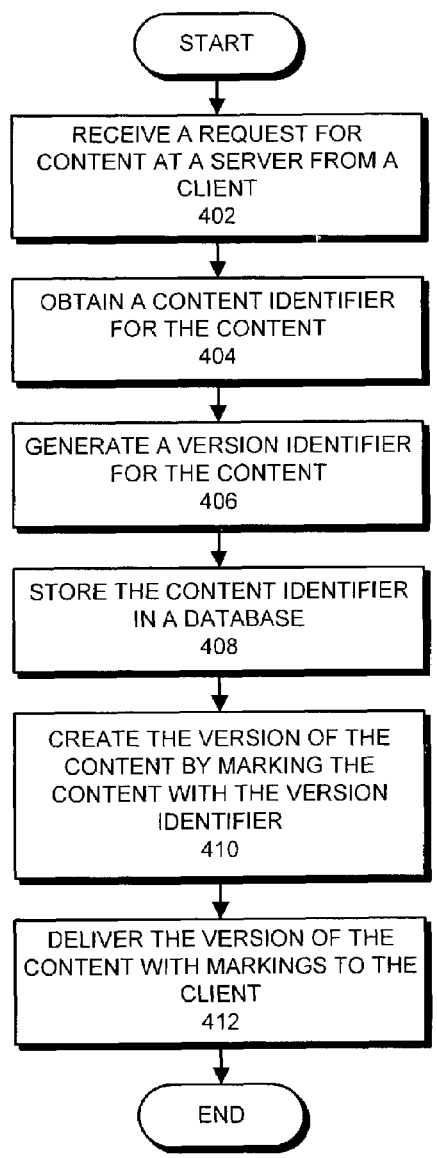
FIG. 4 illustrates the process of marking the content in accordance with an embodiment of the present invention.

FIG. 4 illustrates the process of marking the content in accordance with an embodiment of the present invention. The system starts when server 110 receives a request for content from client 102 (step 402). Server 110 obtains a content identifier for the content, or, if necessary, generates one (step 404). Next, server 110 generates a version identifier for the content (step 406). This version identifier contains information that facilitates subsequent identification of the downloading client, which in this case is client 102.

After the version identifier and the content identifier have been created, server 110 stores this information in database 112 (step 408) and creates the version of the content by marking the content with this information (step 410). Finally, server 110 delivers the version of the content to client 102 (step 412).

Process of Identifying the Original Downloading Client

Figure 5:
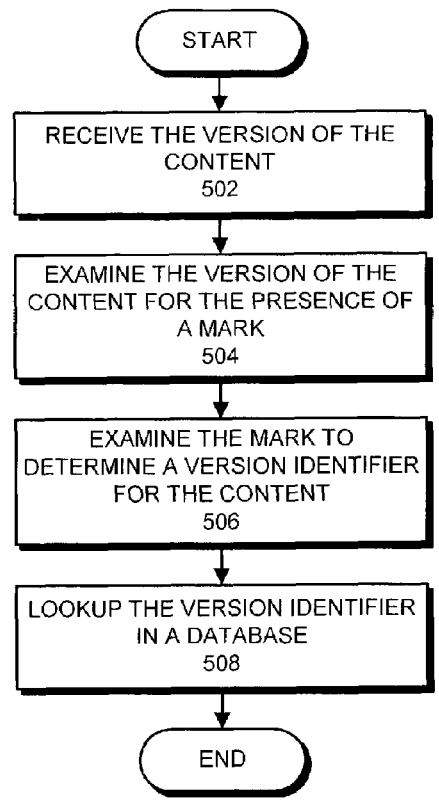
FIG. 5 illustrates the process of identifying the original downloading client in accordance with an embodiment of the present invention.

FIG. 5 illustrates the process of identifying the original downloading client in accordance with an embodiment of the present invention. The system starts when server 110 receives a request to determine the identity of the original downloader of an item of content (step 502). This request includes a version of the content. Server 110 then examines the content for the presence of a mark (step 504). If a mark is found, server 110 examines the mark to determine a version identifier for the content (step 506). Finally, server 110 performs a lookup based on the version identifier in database 112 to identify the original downloading client (step 508).

In one embodiment of the present invention, the system uses a fingerprinting algorithm to generate a content identifier that will be robust in the face of common content altering techniques. In this case, the system finds the content identifier (fingerprint) so that the subset of marks for that content are known and mark detection software for those marks only need be employed.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for marking content during distribution of the content to a client, comprising:

receiving a request for the content from the client at a server;

obtaining a content identifier for the content;

generating a version identifier that uniquely identifies a version of the content that is sent to the client;

storing the content identifier and the version identifier in a database;

creating the version of the content by marking the content with the version identifier such that removal of the mark degrades the quality or usability of the content and renders the content unusable;

delivering the version of the content with markings to the client;

wherein marking the version of the content with the version identifier involves marking different sections of the content using different marking methods, so that any given section of the content is not operated on by all of the marking methods; and whereby the markings on the version of the content facilitate subsequent identification of the client by examining the version of the content or a copy of the version of the content.

2. The method of claim 1, wherein a mark is information added to the content that does not affect usability of the content by the client and facilitates identifying the client at a later time.

3. The method of claim 1, wherein storing the content identifier and the version identifier in the database further involves storing a number of items in the database including, the client's IP address, the current date and time, and information that facilitates identifying the client.

4. A computer-readable storage medium storing instructions that when executed by a computer cause the computer to perform a method for marking content during distribution of the content to a client, the method comprising:

receiving a request for the content from the client at a server;

obtaining a content identifier for the content;

generating a version identifier that uniquely identifies a version of the content that is sent to the client;

storing the content identifier and the version identifier in a database;

creating the version of the content by marking the content with the version identifier such that removal of the mark degrades the quality or usability of the content and renders the content unusable;

delivering the version of the content with markings to the client;

wherein marking the version of the content with the version identifier involves marking different sections of the content using different marking methods, so that any given section of the content is not operated on by all of the marking methods; and whereby the markings on the version of the content facilitate subsequent identification of the client by examining the version of the content or a copy of the version of the content.

5. The computer-readable storage medium of claim 4, wherein a mark is information added to the content that does not affect usability of the content by the client and facilitates identifying the client at a later time.

6. The computer-readable storage medium of claim 4, wherein storing the content identifier and the version identifier in the database further involves storing a number of items in the database including, the client's IP address, the current date and time, and information that facilitates identifying the client.

7. An apparatus for marking content during distribution of the content to a client, comprising:

a receiving mechanism configured to receive a request for the content from the client at a server;

an identification mechanism configured to obtain a content identifier for the content;

a generation mechanism configured to generate a version identifier that uniquely identifies a version of the content that is sent to the client;

a storage mechanism configured to store the content identifier and the version identifier in a database;

a marking mechanism configured to create the version of the content by marking the content with the version identifier such that removal of the mark degrades the quality or usability of the content and renders the content unusable;

a delivery mechanism configured to deliver the version of the content with markings to the client;

wherein the marking mechanism is further configured to mark different sections of the content using different marking methods, so that any given section of the content is not operated on by all of the marking methods; and whereby the markings on the version of the content facilitate subsequent identification of the client by examining the version of the content or a copy of the version of the content.

8. The apparatus of claim 7, wherein a mark is information added to the content that does not affect usability of the content by the client and facilitates identifying the client at a later time.

9. The apparatus of claim 7, wherein the storage mechanism is further configured to store a number of items in the database including, the client's IP address, the current date and time, and information that facilitates identifying the client.

* * * * *